United States Patent
Peacock (10) Patent No.: US 6,412,806 B1
(45) Date of Patent: Jul. 2, 2002

(54) SEAMED TRAILER HITCH COVER

(76) Inventor: Doyle F. Peacock, P.O. Box 1035, Woodville, FL (US) 32362

( * ) Notice: Subject to any disclaimer, the term of this patent is extended or adjusted under 35 U.S.C. 154(b) by 0 days.

(21) Appl. No.: 09/556,396

(22) Filed: Apr. 24, 2000

(51) Int. Cl.[7] .......................... B60R 21/34; B65D 65/08
(52) U.S. Cl. ...................... 280/507; 280/770; 150/166
(58) Field of Search .......................... 280/507, 770; 150/166, 154

(56) References Cited

U.S. PATENT DOCUMENTS

| | | | | |
|---|---|---|---|---|
| 2,671,675 A | * | 3/1954 | Swaisgood | |
| RE34,832 E | * | 1/1995 | Lechuga | 428/99 |
| 5,421,601 A | * | 6/1995 | Hinze et al. | 280/507 |
| 5,439,727 A | * | 8/1995 | Riggs et al. | 428/128 |
| 5,560,631 A | * | 10/1996 | Salvo | 280/507 |
| 5,613,250 A | * | 3/1997 | Bell | 2/242 |
| 5,806,873 A | * | 9/1998 | Glassman | 280/507 |
| 6,039,339 A | * | 3/2000 | Bello | 280/507 |

* cited by examiner

Primary Examiner—Avraham Lerner
(74) Attorney, Agent, or Firm—John Wiley Horton (57) ABSTRACT

A cushioned cover for protecting the exposed metal parts of a hitch assembly. In its preferred embodiment, the cover is comprised of tubular segments. The segments are transected longitudinally by a seam which allows the cover to be opened and easily placed over a hitch assembly. The invention further comprises cinching straps which allow the cover to be tightly fastened to the hitch assembly.

2 Claims, 8 Drawing Sheets

SEAMED TRAILER HITCH COVER

BACKGROUND

1. Field of Invention

This invention relates to the field of trailer hitches. More specifically, the invention comprises a soft cover which can be placed over a variety of trailer hitches both to protect the hitch and to protect persons who might inadvertently run into the hitch.

2. Description of Prior Art

Protective coverings for trailer hitches have been known for quite some time. U.S. Pat. No. 2,671,675 to Swaisgood (1950) discloses such a device. The Swaisgood device is particularly adopted to the type of hitches found in its era—which were typically mounted right next to the vehicle bumper. It does provide protection against accidental contact with the grease and grime on the hitch ball. It also creates an attractive appearance for the covered hitch. However, the Swaisgood device is quite cumbersome to remove and install. It requires the use of a wrench on an exposed bolt head. Additionally, because it is a hard-surfaced device, it does not prevent injury to persons accidentally walking into the hitch.

A device more adapted to modern hitch construction is disclosed in U.S. Pat. No. 4,955,968 to Beckerer, Jr. (1990). The Beckerer, Jr., device is formed as a single piece of molded plastic or rubber. In the case of the plastic version, it has a stand-off distance from the metal of he hitch, thereby providing some cushion for things striking the hitch. The molded rubber version, being apparently made of closed-cell foam (see FIG. 11 of '968 disclosure) appears to provide even more injury protection. The Beckerer, Jr., device appears to adequately protect the area of the hitch ball itself However, modern hitch assemblies have extendable draw bars which may protrude 18 inches or more beyond the vehicle's bumper. The '968 device provides no protection for all that additional metal, which can certainly cause injury as well.

U.S. Pat. No. Des. 316,069 to Yocum (1991) discloses an ornamental design similar to the '968 disclosure. Like the '968 disclosure, it only covers the area immediately surrounding the hitch ball. A similar configuration is disclosed in U.S. Pat. No. Des. 317,745 to Beckerer, Jr. (1991).

U.S. Pat. No. 5,037,122 (1991) to Beckerer, Jr., discloses a refinement of the '968 device. The '122 disclosure provides an improved version of the closed-cell foam rubber protector. It also discloses improved techniques for engaging the device with the hitch assembly. However, the reader will also note that the '122 device is still limited to the area immediately surrounding the hitch ball. Those skilled in the art will also realize that many of the variations disclosed would be difficult to install and remove.

A modern extended draw bar type hitch is disclosed in U.S. Pat. No. 5,421,601 to Hinze et.al. (1995). FIG. 1 of the Hinze et.al. nicely illustrates the shortcoming of a guard which only covers the area immediately adjacent to the hitch ball. A great deal of potentially dangerous metal is left exposed. The Hinze et.al. device addresses this concern with a large, bifurcated box. The box is hollow and split into two halves. Each half can be slipped around the bulky hitch assembly, and then locked together using the clips shown. Because the box is rigid, it must be greatly oversized to accommodate the many variations in hitch assemblies. Those skilled in the art will realize that the hitch assembly illustrated can be adjusted substantially in several directions. This fact causes problems for the approach taken in Hinze et.al.

The known devices for protecting a trailer hitch assembly are therefore limited in that they:

1. Require tools to install and remove;
2. Are difficult to install and remove;
3. Only protect the area immediately surrounding the hitch ball;
4. Are too bulky; and
5. Are not sufficiently flexible to accommodate variations in hitches.

Objects and Advantages

Accordingly, several objects and advantages of the present invention are:

1. To provide a guard which requires no tools to install and remove;
2. To provide a guard which is easy to install and remove;
3. To provide a guard which protects all the exposed metal of the hitch assembly;
4. To provide a guard which is not too bulky; and
5. To provide a guard which is sufficiently flexible to accommodate considerable variations in hitches.

REFERENCE NUMERALS IN DRAWINGS 10 bumper
12 frame
14 receiver
16 attach point
18 draw bar
20 ball mount
22 ball
24 mounting hole
26 washer
28 nut
30 hitch cover
32 seam
34 cinching strap
36 upright segment
38 horizontal segment
40 angled segment 42 receiver segment
44 alternate ball mount
46 alternate hitch cover
48 heavy hitch assembly
50 heavy draw bar
52 heavy ball mount
54 heavy hitch cover

DESCRIPTION OF THE INVENTION

Figure 1:
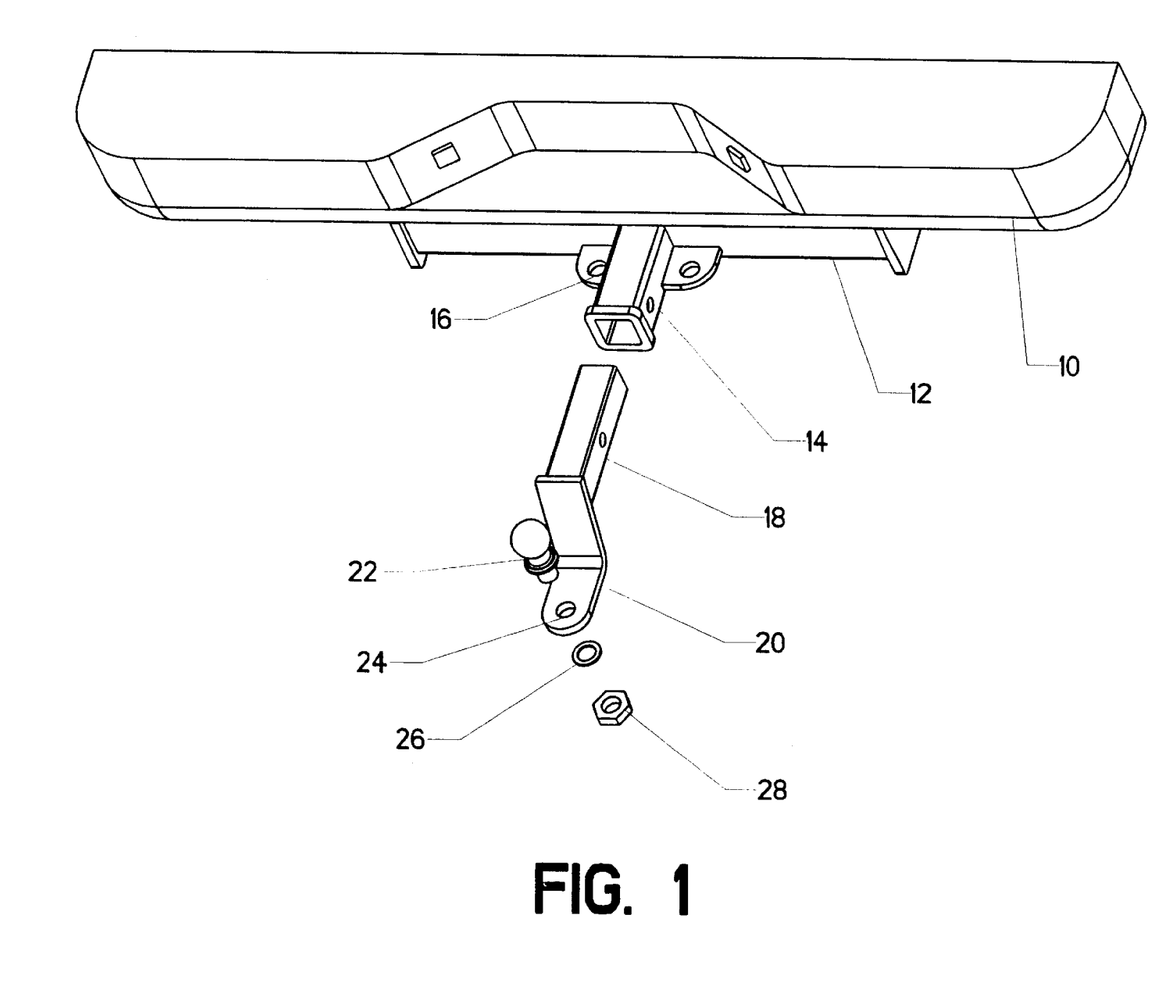
FIG. 1 is an exploded isometric view, showing a typical trailer hitch assembly.

FIG. 1 illustrates a typical trailer hitch assembly. Bumper 10 is shown in order to fix the relationship of the components to the rest of the vehicle (not shown). Frame 12 is attached to the frame of the vehicle immediately below bumper 10. Frame 12 has receiver 14 extending rearward. Two attach points 16 are welded in place at the junction of frame 12 and receiver 14. These provide attachment points for safety chains commonly used in towing.

Receiver 14 has a hollow opening adapted to receive draw bar 18. Draw bar 18 is pushed into receiver 14 and then typically locked in place with some type of cross pin. Ball mount 20 is welded to the rearward portion of draw bar 18. Ball mount 20 has mounting hole 24 oriented vertically. Ball 22 is placed within mounting hole 24. The lower portion of ball 22 comprises a threaded shaft. Washer 26 is placed on said threaded shaft of ball 22 and then nut 28 is used to tightly lock ball 22 to ball mount 20.

Figure 2:
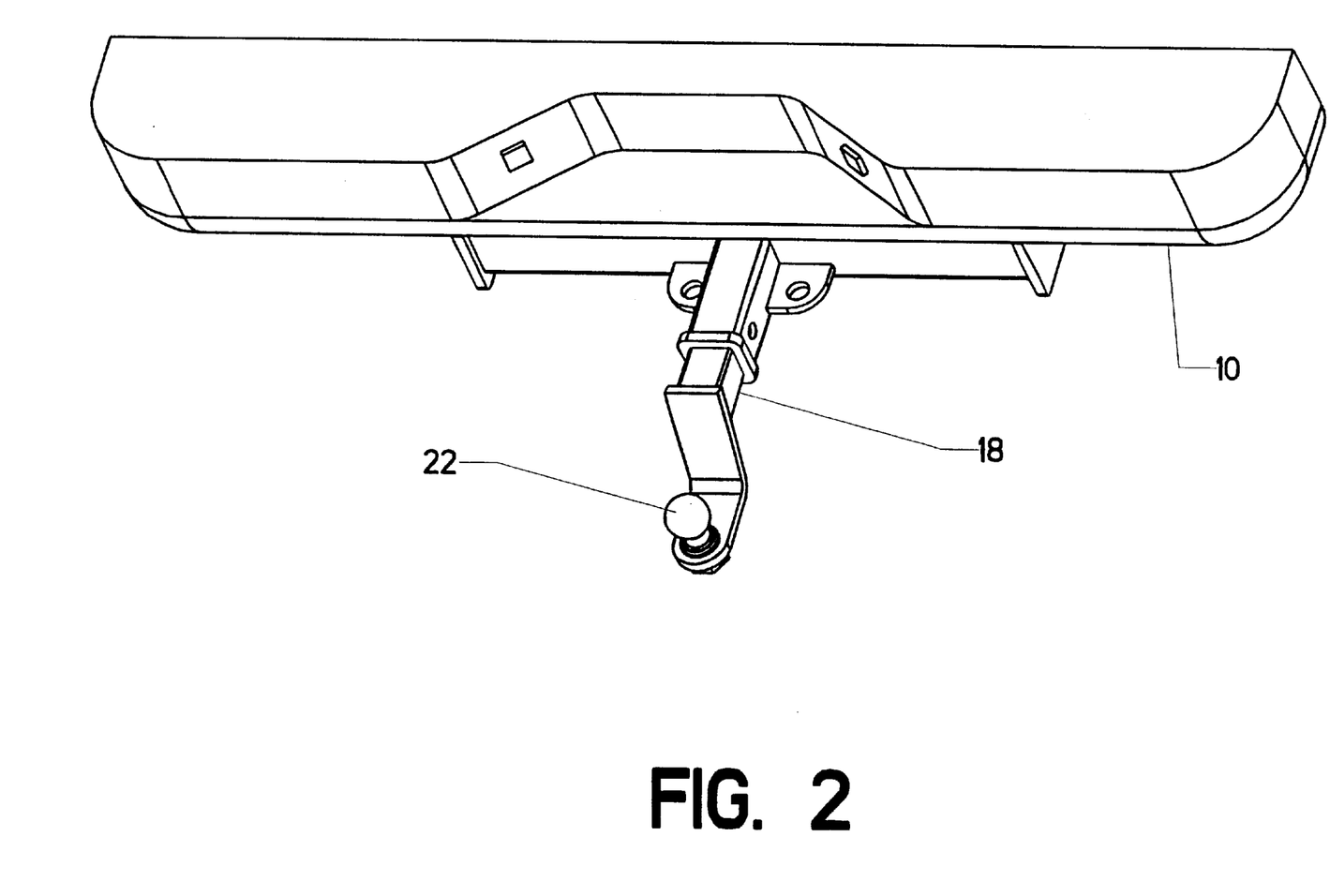
FIG. 2 is a normal isometric view, showing the components of FIG. 1.

FIG. 2 shows the components of FIG. 1 in their normal position. Those skilled in the art will realize that draw bar 18 is fashioned in different lengths, and may also have adjustable extension positions. Thus, it is possible for ball 22 to be positioned closer to or further away from bumper 10. The present invention must take these variations into account.

Those skilled in the art will also realize that the exposed portions of the hitch assembly present a hazard to persons walking around the rear of the vehicle. This is particularly true where the vehicle is placed in a parking lot at night. In such a situation persons will often be walking between the parked cars, where there is another vehicle parked immediately behind the hitch assembly. The hitch assembly is in a very low position and is often therefore in shadow. Persons attempting to walk between the parked vehicles will sharply strike their shins on the exposed metal surfaces of the hitch assembly. While this incident is generally just a painful nuisance, serious injuries resulting from tripping and falling have occurred.

It is therefore important to provide a cushioning guard for the entire exposed assembly. Numerous prior art guards have been proposed for the area immediately surrounding hitch ball 22. While these are helpful, they leave draw bar 18 and other components unguarded. The present invention seeks to alleviate this concern.

Figure 3:
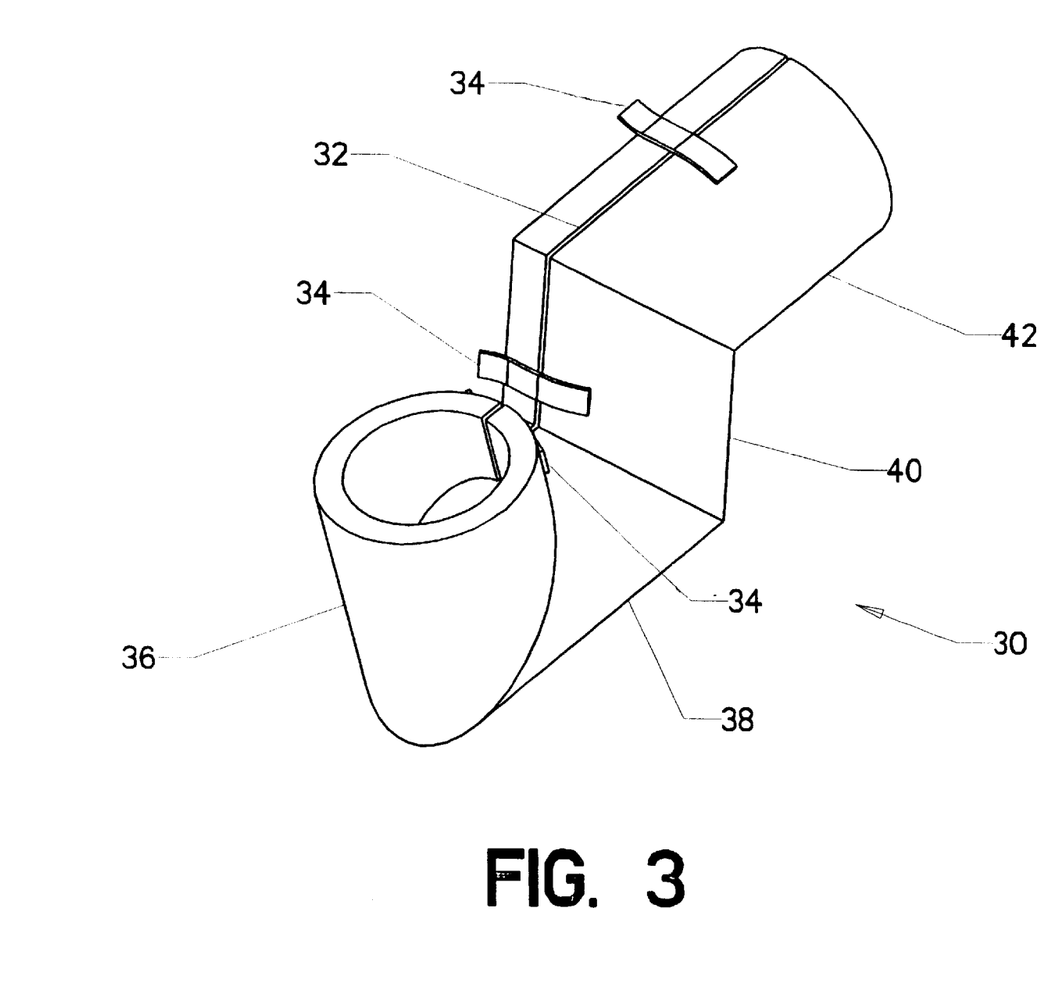
FIG. 3 is an isometric view showing the proposed invention.

FIG. 3 shows hitch cover 30. Hitch cover 30 is made from flexible closed-cell foam. It has essentially a tubular structure with a wall thickness typically between ½ and 1 inch. The material employed is similar to the material used for insulating jackets on soda cans ("can cozy's"). The reader will observe that the particular version of hitch cover 30 illustrated in FIG. 3 is adapted to cover the hitch assembly shown in FIG. 2. It has upright segment 36, horizontal segment 38, angled segment 40, and receiver segment 42. Hitch cover 30 can be fabricated as a flat pattern cut from a sheet of foam material which is then curled and bent into the shape shown—with bonding of the seams. Alternatively, hitch cover 30 can be made of four separate segments which are bonded together.

Figure 4:
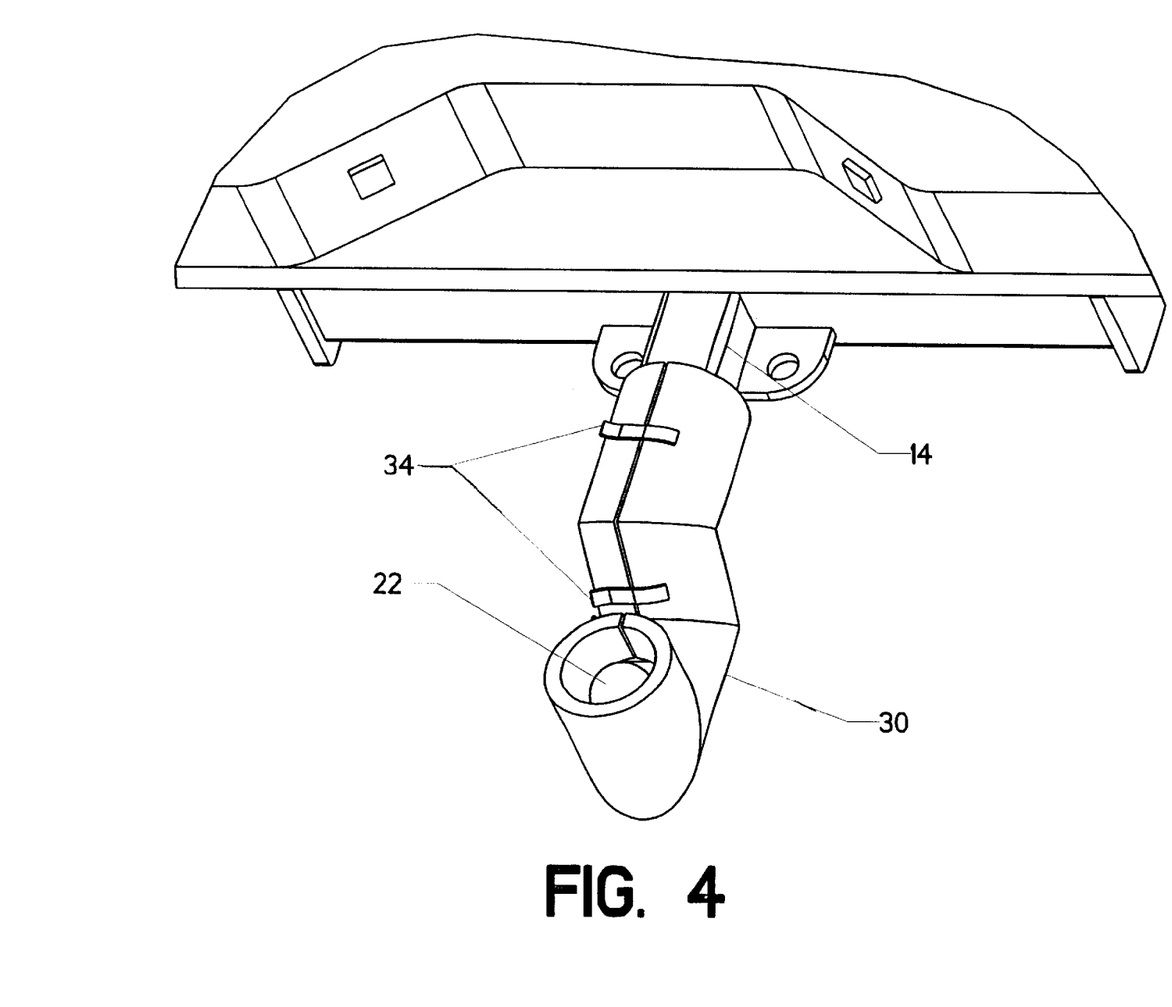
FIG. 4 is an isometric view, showing the proposed invention installed on the trailer hitch assemdly of FIG. 1.

Those skilled in the art will realize that it would be very difficult to slip hitch cover 30 over the hitch assembly of FIG. 2 without the presence of seam 32. Seam 32 transects hitch cover 30 along its entire length. Seam 32 allows the user to lay hitch cover 30 open and easily slip it over a hitch assembly. FIG. 4 illustrates hitch cover 30 after it has been placed over a hitch assembly. The elastic tendencies of hitch cover 30 tend to retain it in place. However, as significant wind buffeting and other forces are experienced as the vehicle travels down the road, additional fixation is desirable. A plurality of cinching straps 34 are provided to close seam 32. Virtually any type of closure mechanism could be used. However, as cost is a concern, VELCRO type straps have been found to be particularly effective. This type of strap allows the user to easily adjust hitch cover 30 to accommodate a wide variety of hitch shapes.

Those skilled in the art will realize that seam 32 may be placed along the bottom surfaces of hitch cover 30, rather than the top surfaces (as illustrated). Placing seam 32 on the bottom may, in fact, better protect the hitch assembly from rain and condensing moisture. It does, however, make adjusting and securing hitch cover 30 more difficult—since the user cannot easily see under the hitch assembly.

The type of hitch assembly illustrated in FIGS. 1, 2, and 4 is the type most commonly in use. Accordingly, the version of the invention depicted in FIG. 3 is the preferred embodiment.

Figure 5:
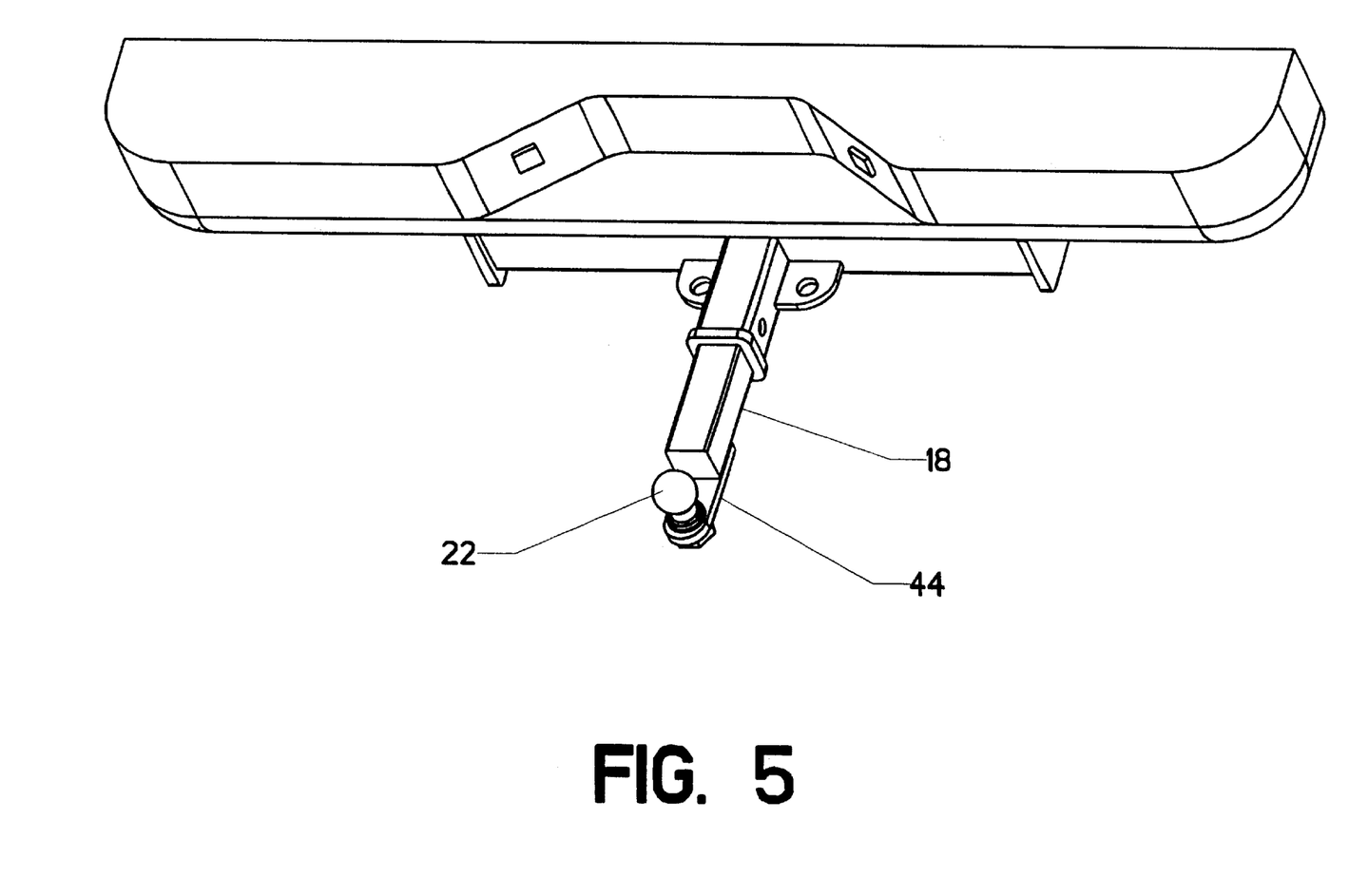
FIG. 5 is an isometric view showing a second type of trailer hitch assembly.
Figure 6:
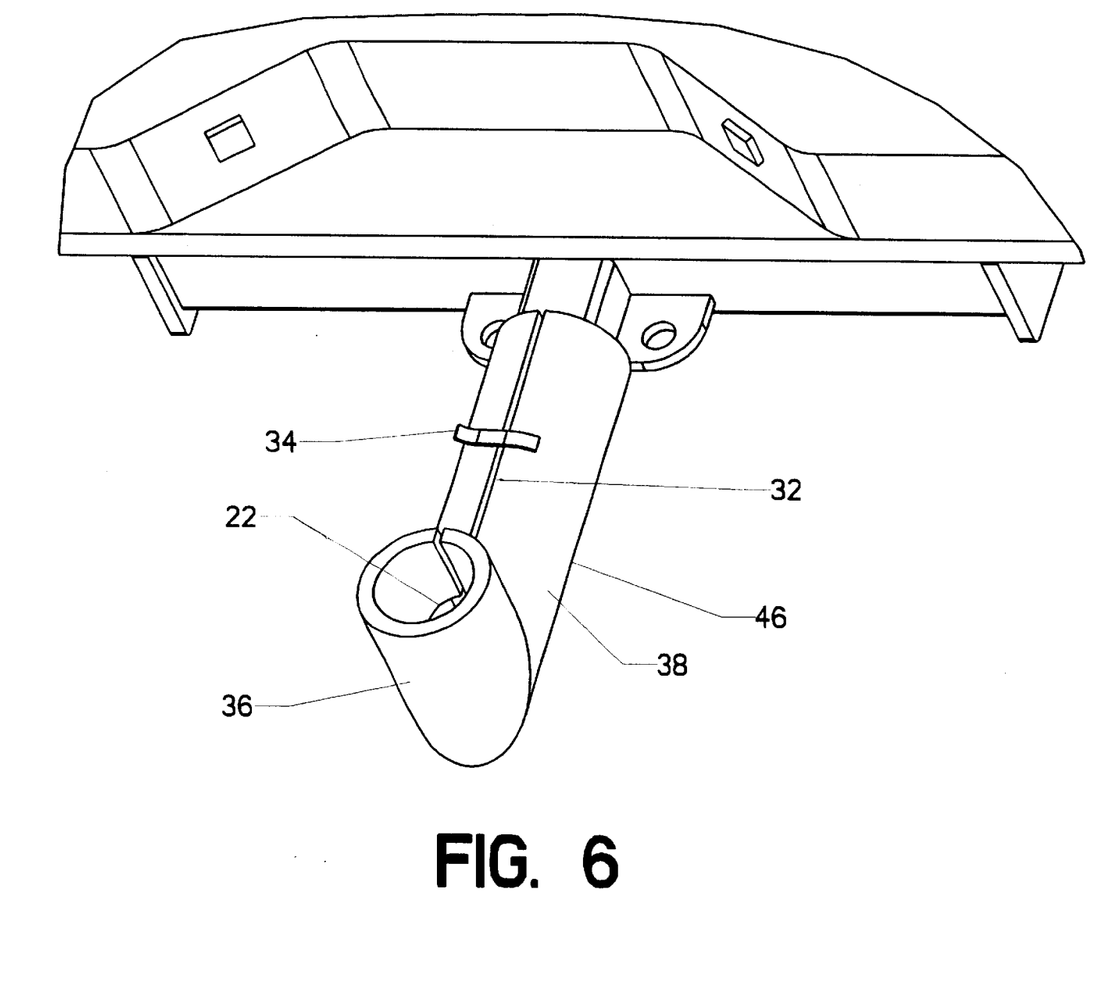
FIG. 6 is an isometric view showing an alternate embodiment of the proposed invention installed on the trailer hitch assembly of FIG. 5.

FIG. 5 shows another type of hitch assembly commonly in use. Alternate ball mount 44 is attached to draw bar 18. FIG. 6 shows alternate hitch cover 46 in place over the hitch assembly illustrated in FIG. 6. The reader will observe that alternate hitch cover 46 has only two segments—upright segment 36 and horizontal segment 38. This simplified version is possible because of the cleaner shape presented by the hitch assembly of FIG. 5. Alternate hitch cover 46 has seam 32 and the same cinching straps 34 discussed previously, although it may not need as many cinching straps 34.

Those skilled in the art will realize that seam 32 is not strictly necessary for a simplified hitch assembly like the one illustrated in FIG. 5. Since alternate hitch cover 46 is comprised of only two flexible segments, it is possible to slip it into place without having seam 32. Accordingly, an additional embodiment of the proposed invention is to have alternate hitch cover 46 without seam 32.

Figure 7:
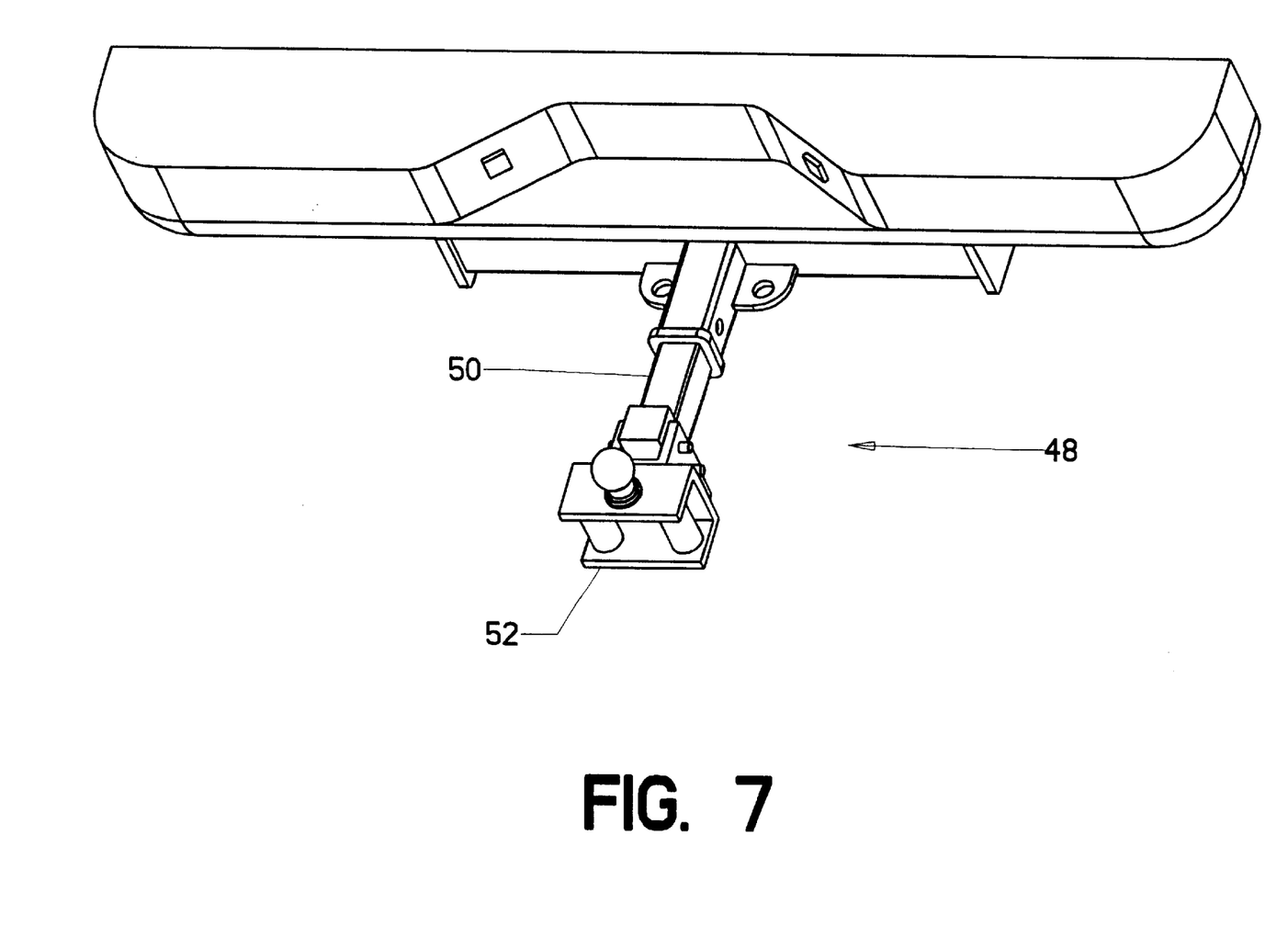
FIG. 7 is an isometric view showing a third type of trailer hitch assembly.

In contrast to the cleaner hitch assembly illustrated in FIG. 5, the assembly illustrated in FIG. 7 presents quite a challenge. Heavy hitch assembly 48 has heavy draw bar 50 and heavy ball mount 52. This type of hitch assembly is commonly used to pull heavy loads which require the use of load distributing links. Those skilled in the art will realize that heavy ball mount 52 may be adjusted vertically in its attachment to heavy draw bar 50.

Figure 8:
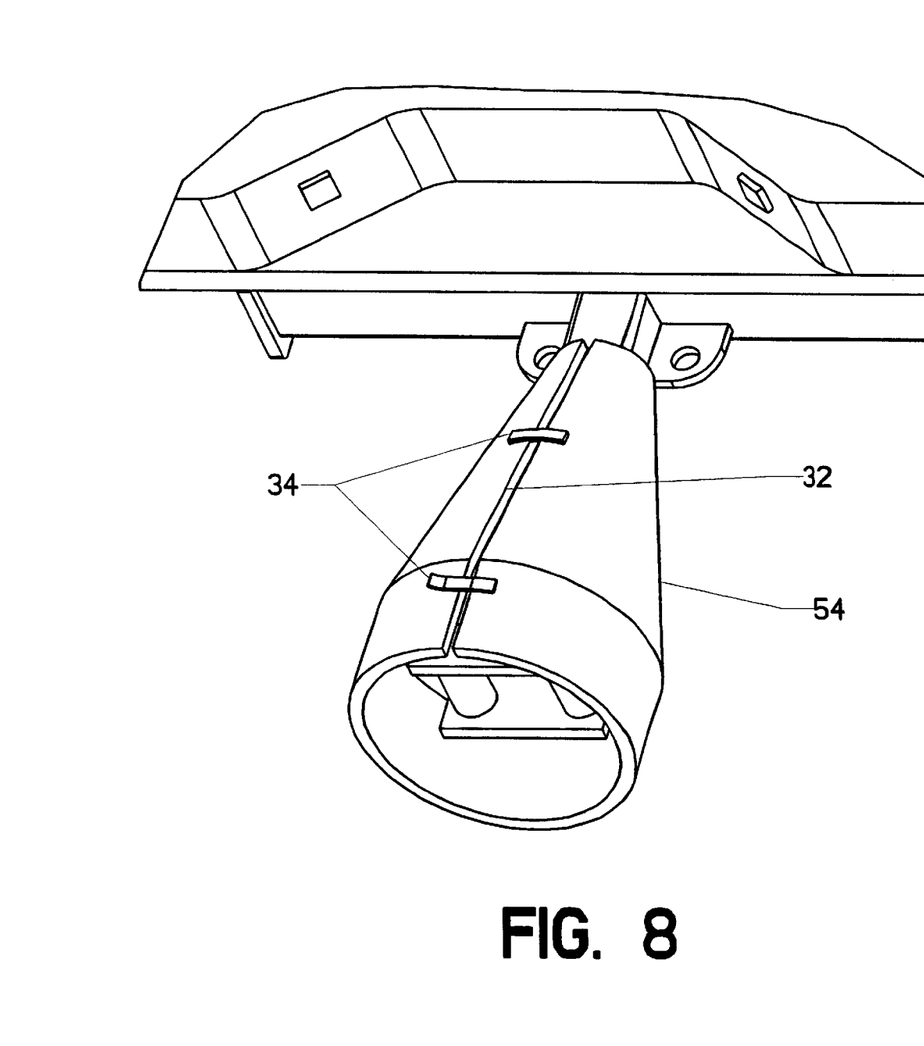
FIG. 8 is an isometric view showing yet another alternate embodiment of the proposed invention installed on the trailer hitch assembly of FIG. 7.

FIG. 8 illustrates heavy hitch cover 54 in place on the hitch assembly illustrated in FIG. 7. Heavy hitch cover 54 has an enlarged and tapered shape allowing it to encompass this type of large hitch assembly. Like the other disclosed embodiments, it is transected by seam 32. It also has a plurality of cinching straps 34. The reader will observe that heavy hitch cover 54 covers and guards heavy hitch assembly 48.

SUMMARY, RAMIFICATIONS, AND SCOPE

Accordingly, the reader will appreciate that the proposed invention effectively guards all the exposed metal surfaces of a variety of hitch assemblies. The invention has further advantages in that it:

1. Provides a guard which requires no tools to install and remove;
2. Provides a guard which is easy to install and remove;
3. Provides a guard which protects all the exposed metal of the hitch assembly;
4. Provides a guard which is not too bulky; and
5. Provides a guard which is sufficiently flexible to accommodate considerable variations in hitches.

Although the preceding description contains significant detail, it should not be construed as limiting the scope of the invention but rather as providing illustrations of the preferred embodiments of the invention. Many different shapes of hitch cover could be employed. The key features of the present invention are the fact that it effectively covers all of the exposed metal, and the fact that it is transected by a seam allowing the hitch cover to be opened and easily slipped over the hitch assembly. Thus, the scope of the invention should be fixed by the following claims, rather than by the examples given.

Having described my invention, I claim:

1. A protective cover for a trailer hitch assembly having a receiver, a draw bar, a ball mount, wherein said ball mount is formed in the shape of an angled portion attached to said draw bar and a horizontal portion extending rearward from said angled portion, and a ball, comprising:
    a. a first horizontal segment, approximately cylindrical in shape, and adapted to fit around said draw bar;
    b. an angled segment, connected to said first horizontal segment, approximately cylindrical in shape, and adapted to fit around said angled portion of said ball mount;
    c. a second horizontal segment, connected to said angled segment, approximately cylindrical in shape, and adapted to fit around said horizontal portion of said ball mount;
    d. an upright segment, connected to said second horizontal segment, approximately cylindrical in shape, and adapted to fit around said ball;
    e. wherein said first horizontal segment, said first angled segment, said second horizontal segment, and said upright portion are cut by a longitudinal seam;
    f. a first cinching strap, located on said first horizontal segment, and adapted to close said seam within said first horizontal segment so as to close said seam and thereby cinch said tubular hitch cover around said draw bar; and
    g. a second cinching strap, located on said upright segment, and adapted to close said seam within said upright segment so as to close said seam and thereby cinch said tubular hitch cover around said ball.

2. A protective cover as recited in claim 1. further comprising a third cinching strap, located on said angled segment, and adapted to close said seam within said angled segment and thereby cinch said tubular hitch cover around said angled portion of said draw mount.

* * * * *